Nov. 12, 1957   E. G. DUSTIN   2,812,743
TIE-OUT STAKE
Filed Jan. 27, 1956
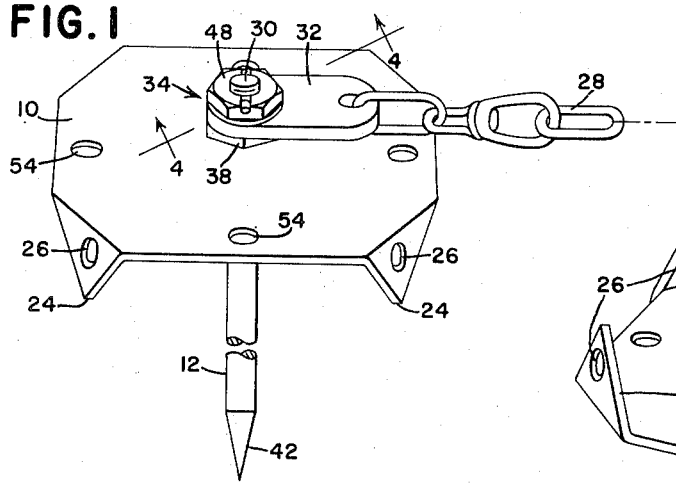
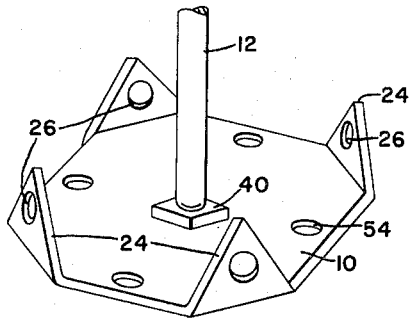
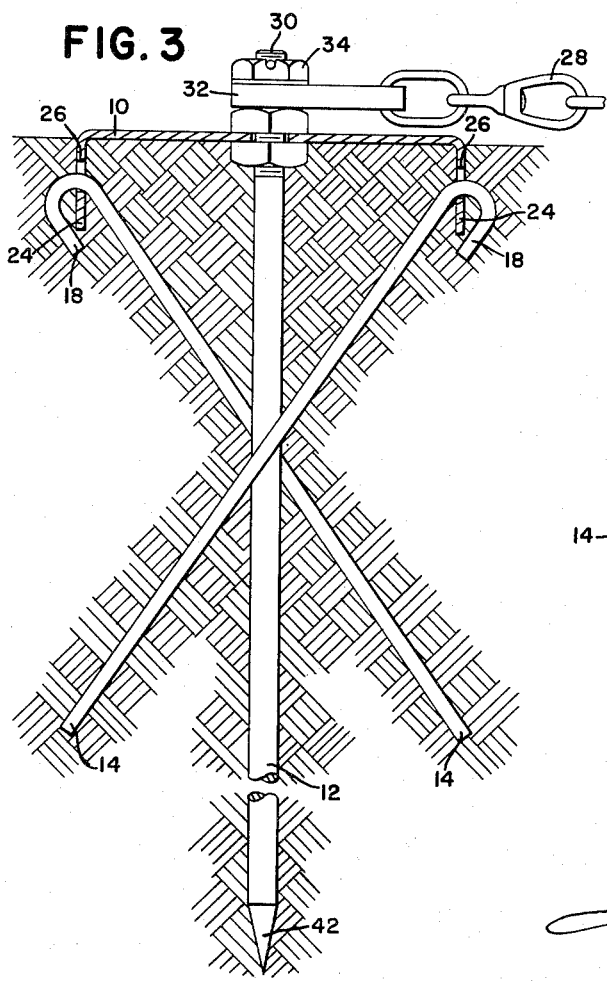
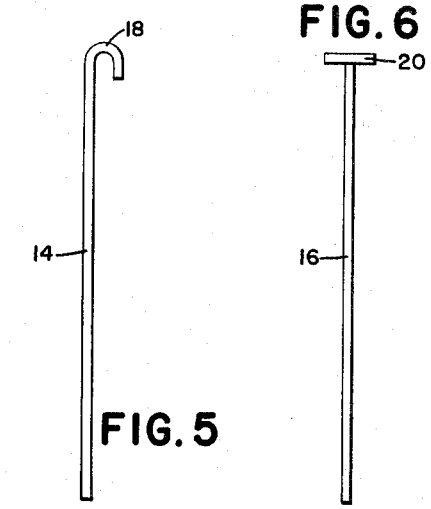
INVENTOR.
E. G. DUSTIN
ATTORNEY

United States Patent Office 2,812,743
Patented Nov. 12, 1957

2,812,743
TIE-OUT STAKE
Ernest G. Dustin, Galva, Ill.
Application January 27, 1956, Serial No. 561,777
3 Claims. (Cl. 119—117)

This invention relates to a tie-out stake or tethering device and has for a principal object the provision of an improved stake including ground anchors.

It is known of course to provide tie-out stakes for tethering large and small animals and for other purposes but these leave much to be desired in the way of simplicity, low cost and the ability to stay in the ground. According to this invention prior disadvantages are eliminated in a tethering device having a top plate provided rigidly with a central stake and outer ground-penetrating prongs, certain of the prongs being apertured to receive a ground anchor and the ground anchors being driven into the ground so as to intersect below the plate and generally on the axis of the central stake. The improved design includes simple and novel means for rigidly interconnecting the stake and plate without weakening the stake. The ground anchors and their relation to the plate prongs are such that the heads of the anchors are below or at the upper surface of the plate and thus clear of the plane of rotation of the tether that is swivelly attached to the top of the plate. In this respect it is an object of the invention to provide improved means for mounting the swivel.

The foregoing and other important features of the invention will become apparent as the disclosure progresses in connection with the accompanying drawing in which:

Figure 1 is a top perspective of the tethering device without the ground anchors;

Figure 2 is a bottom perspective of the same;

Figure 3 is a section showing the ground installation of the device;

Figure 4 is an enlarged section on the line 4—4 of Figure 1; and

Figures 5 and 6 are views of different types of ground anchors.

The basic device comprises a plate 10, preferably of steel, a rigidly attached ground-penetrating stake 12 and a plurality of preferably integral ground anchors 14, such as in Figure 5. Alternatively, ground anchors of the type shown at 16 in Figure 6 may be employed. In each case, the important factor is that the anchors, although headed for purposes to presently appear, are able to be driven home substantially flush with the ground. The headed end of the anchor 14 is in the form of a hook 18 and the head on the anchor 16 is of upset fashion, as at 20, similar to a typical bolt, which of course suggests that suitable bolts, etc. could be used.

The plate 10 has a central aperture 22 on an upright axis, the plane of the plate in use being normally horizontal. The plate further has rigid thereon a plurality, here four, of ground-penetrating prongs 24 of triangular shape. Preferably the plate is constructed of a square of which the four corners are bent down to afford the prongs. In the present case, each prong has an aperture 26 so located that when the plate rests on the ground with the prongs penetrating the ground the apertures 26 are below the ground surface and the anchors 14 (or 16) are driven into the ground at downward and radially inward angles to intersect substantially on the axis of the stake 12 (Figure 3), it being noted that the hooks or heads 18 of the anchors lie below the surface of the plate 10 and thus clear of the plane of rotation of a tether 28 that is attached to the upper end 30 of the stake 12 by a swivel 32 and retaining means 34, to be presently described.

The upper end 30 of the stake 12 is threaded at 36 both above and below the plate as the stake is passed through the central aperture 22 (Figure 4), and the threads receive upper and lower lock nuts 38 and 40, respectively, which are securely tightened to grip the plate between them so as to achieve a rigid interconnection between the plate and stake. This manner of construction avoids weakening of the stake as would be the case were the upper end reduced in diameter to afford a shoulder in place of the lower nut 40. Hence, the stake here is of substantially uniform diameter except of course for its lower pointed end 42.

The threaded end or stake extension 30 is long enough to project upwardly beyond the upper nut 38 and thus affords a coaxial pivot for the swivel 32, which has a central hole 44 loosely and rotatably receiving said portion 30. A washer 46 is interposed between the swivel and the retaining means 34.

The retaining means includes a third nut 48 threaded onto the threaded stake portion 30 above and retaining the swivel for rotation about the stake. This nut is countersunk at 50 and the stake portion 30 is cross-drilled to receive a lock device such as a cotter pin 52, which holds the nut 48 against rotation relative to the stake and prevents accidental disconnection of the swivel and tether.

The plate 10 may have additional apertures 54 and as a matter of choice may be formed in the first instance of perforated metal. When used on a lawn, grass may grow through such apertures and camouflage the device.

The device is produced completely assembled, the plate and stake being rigidly interconnected by the means 30—38—40 and the swivel mounted by the means 30 and retained by the means 34. The anchors, either 14 or 16 or their equivalent, are provided as part of the package. Use of the device involves merely driving the stake 12 into the ground until the top of the plate is flush or nearly flush with the ground, the prongs 24 of course penetrating the ground. The anchors in suitable number are driven through the respective prong apertures as in Figure 3. The tenacity of the hold of the device on the ground is more than adequate for the purposes intended, it being understood that devices of various sizes are provided according to the task to be performed. Fewer or more prongs 24 may be provided and all or fewer than all may be apertured, it being desirable however that at least diametrically opposite prongs be so apertured in order to achieve the intersecting relationship of the anchors 14 (or 16).

Other features and advantages not categorically enumerated herein will occur to those versed in the art, as will further variations in the structure disclosed, all of which may be achieved without departure from the spirit and scope of the invention.

What is claimed is:

1. A tethering device, comprising: a flat top plate of rectangular shape having its four corners directed downwardly from the plane of the plate and affording ground-penetrating prongs adapted to enter the ground so that the plate is substantially flush with the ground, said plate having a central aperture and each prong having an aperture therethrough so located as to lie beneath the ground surface when said prong fully enters the ground; a ground-penetrating stake having its upper end passed through the central aperture in the plate and projecting above the plate, said stake being of uniform diameter throughout except for a pointed lower end and said upper end having screw threads thereon both above and below the plate; upper and lower lock nuts threaded onto the upper end of the stake respectively above and below the plate to securely grip the plate therebetween in a rigid connection with the stake, a portion of said upper end extending upwardly beyond the upper lock nut; a tether extending radially from the stake above the plate and having a swivel apertured to loosely and rotatably receive said extending portion of the stake upper end; a third nut threaded onto the extending portion above and retaining the swivel; a locking device holding said third nut against rotation; and a plurality of ground anchors passed respectively through certain of the apertured prongs to enter the ground at downward and radially inward angles so as to intersect below the plate and substantially alongside the stake, each anchor having a head engaging its respective prong below the ground surface and each head being of such height as to lie generally below the upper surface of the plate when said anchor is driven home, whereby said heads are clear of the tether.

2. A tethering device, comprising: a flat top plate of rectangular shape having its four corners directed downwardly from the plane of the plate and affording ground-penetrating prongs adapted to enter the ground so that the plate is substantially flush with the ground, said plate having a central aperture and each proing having an aperture therethrough so located as to lie beneath the ground surface when said prong fully enters the ground; a ground-penetrating stake having its upper end passed through the central aperture in the plate and projecting above the plate, said stake being of uniform diameter throughout except for a pointed lower end and said upper end having screw threads thereto both above and below the plate; upper and lower lock nuts threaded onto the upper end of the stake respectively above and below the plate to securely grip the plate therebetween in a rigid connection with the stake, a portion of said upper end extending upwardly beyond the upper lock nut; a tether extending radially from the stake above the plate and having a swivel apertured to loosely and rotatably receive said extending portion of the stake upper end; retaining means engaged with the extending portion above and retaining the swivel; and a plurality of ground anchors passed respectively through certain of the apertured prongs to enter the ground at downward and radially inward angles so as to intersect below the plate and substantially alongside the stake, each anchor having a head engaging its respective prong below the ground surface and each head being of such height as to lie generally below the upper surface of the plate when said anchor is driven home, whereby said heads are clear of the tether.

3. A tethering device, comprising: a flat top plate having a central aperture on an upright axis and further including a plurality of rigidly attached depending prongs spaced angularly about said axis and adapted to penetrate the ground, each of at least certain of the prongs having an aperture therethrough so located as to lie below the ground when the prongs penetrate the ground; a ground-penetrating stake having its upper end rigidly attached to the plate via said central aperture and affording an upper coaxial pivot above the plate; a tether extending radially from the stake above the plate and having a swivel apertured to loosely and rotatably receive said extending portion of the stake upper end; retaining means engaged with the extending portion above and retaining the swivel; and a plurality of ground anchors passed respectively through certain of the apertured prongs to enter the ground at downward and radially inward angles so as to intersect below the plate and substantially alongside the stake, each anchor having a head engaging its respective prong below the ground surface and each head being of such height as to lie generally below the upper surface of the plate when said anchor is driven home, whereby said heads are clear of the tether.

References Cited in the file of this patent

UNITED STATES PATENTS

| | | |
|---|---|---|
| 344,683 | Sherer | June 29, 1886 |
| 425,385 | McKay | Apr. 8, 1890 |
| 824,182 | Knoff | June 26, 1906 |
| 1,550,276 | Nilson | Aug. 18, 1925 |
| 2,525,890 | Gage | Oct. 17, 1940 |